United States Patent Office 3,457,310
Patented July 22, 1969

---

3,457,310
HEXAHALOXYLIDIDES
Bryant C. Fischback, Walnut Creek, and Guy H. Harris,
Concord, Calif., assignors to The Dow Chemical Company, Midland, Mich., a corporation of Delaware
No Drawing. Filed Jan. 23, 1967, Ser. No. 610,774
Int. Cl. C07c *103/12*
U.S. Cl. 260—562                                       4 Claims

ABSTRACT OF THE DISCLOSURE

New compounds have the formula

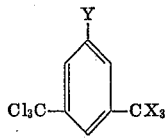

wherein X is chlorine or fluorine and Y is nitro, amino or mineral acid salt thereof, acylamino, or fluorinated acylamino. These compounds have bactericidal and fungicidal activity.

---

BACKGROUND OF THE INVENTION

The present invention relates to new compounds which are useful as intermediates and as biologically active substances. It relates particularly to nitrogen-substituted halogenated xylenes having the structural formula

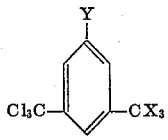

wherein X is chlorine or fluorine and Y is nitro, amino or strong mineral acid salt thereof, acylamino or fluorinated acylamino where acyl has 2–3 carbon atoms and may contain 0–5 fluorine atoms.

Compounds somewhat similar to those described above are known, particularly such compounds where fluorine is the sole halogen in the molecule. These known compounds have been used principally as chemical intermediates.

SUMMARY OF THE INVENTION

It has now been found that compounds of the above structural formula are particularly valuable for their bactericidal and fungicidal activity. These new compounds also have an advantage as chemical intermediates in that at least one trichloromethyl group is always present in the molecule. Such a group is easily hydrolyzed to make carboxylic acid and carboxamide derivatives, for example.

DETAILED DESCRIPTION

Compounds of the above formula can be prepared from known starting materials by conventional procedures. For example, 5-nitro-m-xylene can be chlorinated under side-chain chlorinating conditions to make the α,α'-hexachloro derivative. This then serves as a source for the amino and acetamido compounds. Compounds where X in the formula represents fluorine are conveniently made by reacting 5-nitro-α,α'-hexafluoro-m-xylene with a metal halide such as aluminum chloride and further reacting the product as desired.

Of particular interest among the compounds defined by the above formula are those where Y represents an amino group or derivative thereof. Preferred compounds of this group are those where Y represents acylamino or fluorinated acylamino as defined above and as defined specifically by the formula

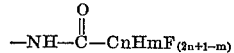

where $n$ is 1 or 2 and $m$ is 0 to $2n+1$. Representative compounds are α,α,α,α',α',α'-hexachloro-2,2,2-trifluoro-3',5'-acetoxylidide, α,α,α,α',α',α'-hexachloro-2-fluoro-3',5'-acetoxylidide, α,α,α-trichloro-α',α',α'-trifluoro-3',5'-acetoxylidide, α,α,α-trichloro-α',α',α'-2,2,3,3-heptafluoro-3',5'-propioxylidide, and α,α,α,α',α',α'-hexachloro-3',5'-propioxylidide. Such compounds are particularly preferred for their microbicidal activity and for their value as intermediates for compounds of pharmaceutical interest.

Also included in this group are the mineral acid salts of the amines. Strong mineral acids such as the hydrogen halides, sulfuric acid, nitric acid, phosphoric acid, and perchloric acid are included by the term.

Example 1

A mixture of 242.3 g. of α,α,α,α',α',α'-hexafluoro-5-nitro-m-xylene, 567 g. of acetyl chloride, and 283.5 g. of aluminum chloride was heated with stirring at 50° C. for 30 minutes in a flask equipped with a reflux condenser. The condenser was then removed and the reaction mixture was heated at 70° C. until substantially all of the acetyl chloride had been distilled. Ice was added to the solid residue and water was added after the solid had broken up, thereby forming two liquid phases. The organic phase was separated by ether extraction, the ether extract was steam distilled, and the steam distillate was extracted with pentane. The pentane extract was then distilled to obtain as separate fractions 53.1 g. of unreacted starting material and 64.1 g. of α,α,α-trichloro-α',α',α'-trifluoro-5-nitro-m-xylene, a pale yellow liquid boiling at 141–142° C. at 15 mm. The identity of the latter compound was confirmed by elemental analysis and infrared spectroscopic examination.

Example 2

The residue from the steam distillation of Example 1 was extracted with pentane and the extract was distilled under reduced pressure to obtain 98.7 g. of α,α,α,α',α',α'-hexachloro-5-nitro-m-xylene, a pale yellow liquid boiling at 177–179° C. at 1.5 mm. Its identity as the named compound was confirmed as above. This compound can also be prepared by conventional side chain chlorination of 5-nitro-m-xylene.

Example 3

The compound of Example 2 was reduced to the corresponding amine by adding a solution of 98.7 g. of the compound in 100 ml. of acetone to a solution of 328 g. of stannous chloride dihydrate in a mixture of 656 g. of 50 percent by weight aqueous ethanol and 328 g. of conc. hydrochloric acid. The temperature was held below 32° C. during the addition by cooling the reaction flask in a water bath. After the reaction mixture had stood at room temperature for 18 hrs., the precipitated solid was filtered off, washed with methylene dichloride, and dried to obtain 54.0 g. of α,α,α,α',α',α'-hexachloro-3,5-xylidine hydrochloride, a white solid. This compound was dissolved in excess sodium hydroxide to liberate the free amine which was separated and purified through its ether extract. The separated amine was a light tan solid melting at 128.5° C., weight 23.9 g. Its identity was confirmed as before.

Example 4

By the procedure shown in Example 3, 70.6 g. of α,α,α-trichloro-α',α',α'-trifluoro-5-nitro-m-xylene was reacted with an excess of stannous chloride. The reaction mixture was treated with a liter of conc. hydrochloric acid and the precipitated solid was collected and washed with methylene chloride. This product was α,α,α-trichloro-α',α',α'-trifluoro-3,5-xylidine hydrochloride, a pale yellow solid, yield 68.2 g. It was converted to the free amine as before to obtain 36.0 g. as a pale yellow oil. The identity of the compound as named was confirmed by elemental and infrared spectroscopic analyses.

The hydrobromide and hydroiodide salts of the amines of Examples 3 and 4 are easily prepared by adding the dry hydrogen halide to a solution of the amine in ether, methylene chloride, or other such organic solvent, whereupon the hydrohalide salt precipitates as a white or yellowish solid. Salts of other mineral acids as defined above are similarly prepared.

Example 5

A mixture of 3.0 grams of powdered α,α,α,α',α',α'-hexachloro-3,5-xylidine and 50 ml. of trifluoroacetic anhydride was stirred for 3 hours. The solid material was filtered off and dried to obtain 3.4 g. of a white solid melting at 143° C. Elemental analysis confirmed its identity as α,α,α,α',α',α'-hexachloro-2,2,2-trifluoro-3',5'-acetoxylidide.

Example 6

Excess acetic anhydride was added to a benzene solution of about 3.6 g. of α,α,α-trichloro-α',α',α'-trifluoro-3,5-xylidine and the mixture was allowed to stand several days. The reaction mixture was then stirred with excess water and the resulting benzene layer was separated and dried. Upon evaporation of the benzene, a residue of 1.9 g. of yellow solid was obtained. This was recrystallized from xylene to obtain pale yellow crystals of α,α,α-trichloro-α',α',α'-trifluoro-3',5'-acetoxylidide, M.P. 129–130° C. The identity of the product as named was confirmed by elemental analysis.

Example 7

As shown in Example 6, α,α,α,α',α',α'-hexachloro-3,5-xylidine was reacted with excess acetic anhydride to obtain a near theoretical yield of α,α,α,α',α',α'-hexachloro-3',5'-acetoxylidide, a white solid, M.P. 166–169° C. Elemental analysis confirmed the identity of the product as named.

Other compounds such as the propioamino and fluorinated propioamino derivatives corresponding to the acetamino compounds shown in the above examples are prepared by the same procedure.

These compounds are effective for the control of internal parasites such as various parasitic worms when fed to infected animals in low concentrations in their diet. They also have herbicidal and insecticidal activity as active ingredients of contact sprays or dusts. The amines and derivatives thereof as defined above are particularly useful for the control of microorganisms such as those causing apple scab, rice blast, late tomato blight, and other fungal and bacterial organisms when applied to them or their habitat in aqueous solution or suspension in concentrations of the order of 25–100 parts per million by weight.

We claim:
1. A compound having the formula

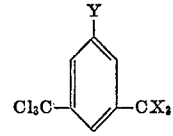

wherein X is chlorine or fluorine and Y is alkanoylamino or fluorinated alkanoylamino where alkanoyl is of 2–3 carbon atoms and contains 0–5 fluorine atoms.

2. The compound of claim 1 wherein X is chlorine and Y is —NHCOCH$_3$.

3. The compound of claim 1 wherein X is chlorine and Y is —NHCOCF$_3$.

4. The compound of claim 1 wherein X is fluorine and Y is —NHCOCH$_3$.

References Cited
UNITED STATES PATENTS 3,331,874   7/1967   Stecker _____ 260—562

HENRY R. JILES, Primary Examiner

HARRY I. MOATZ, Assistant Examiner

U.S. Cl. X.R.

260—580, 646; 424—324